United States Patent
Scott (10) Patent No.: US 12,427,973 B2
(45) Date of Patent: Sep. 30, 2025

(54) SYSTEMS AND METHODS FOR DETECTING AVAILABLE PARKING SPOTS WITH OPTIONAL PULL-THROUGH PARKING SPOTS

(71) Applicant: Valeo Schalter und Sensoren GmbH, Bietigheim-Bissinger (DE)

(72) Inventor: Daniel Bartram Scott, Troy, MI (US)

(73) Assignee: Valeo Schalter und Sensoren GmbH (DE)

(*) Notice: Subject to any disclaimer, the term of this patent is extended or adjusted under 35 U.S.C. 154(b) by 288 days.

(21) Appl. No.: 18/221,216

(22) Filed: Jul. 12, 2023

(65) Prior Publication Data
US 2025/0018930 A1    Jan. 16, 2025

(51) Int. Cl.
*B60W 30/06* (2006.01)
*B60W 50/14* (2020.01)
(Continued)

(52) U.S. Cl.
CPC ........... *B60W 30/06* (2013.01); *B60W 50/14* (2013.01); *G06V 10/16* (2022.01); *G06V 20/586* (2022.01);
(Continued)

(58) Field of Classification Search
CPC ...... G06V 20/586; G08G 1/143; G08G 1/146; B60W 2050/146; B60W 2420/403; B60W 2420/54; B60W 2540/215
See application file for complete search history.

(56) References Cited

U.S. PATENT DOCUMENTS

| | | | |
|---|---|---|---|
| 11,256,933 B2 | 2/2022 | Okada et al. | |
| 11,699,345 B2 * | 7/2023 | Dudar | B60W 30/06 340/932.2 |

(Continued)

FOREIGN PATENT DOCUMENTS

| | | |
|---|---|---|
| CN | 109923586 A | 6/2019 |
| CN | 114120696 A | 3/2022 |
| FR | 3069221 A1 | 1/2019 |

OTHER PUBLICATIONS

International Search report and Written Opinion for PCT/US2024/037293, Dated Oct. 17, 2024, All together 9 Pages.

*Primary Examiner* — Quan Zhen Wang
*Assistant Examiner* — Mancil Littlejohn, Jr.
(74) *Attorney, Agent, or Firm* — Dickinson Wright PLLC (57) ABSTRACT

In some implementations, the device may include receiving, via one or more image sensors, one or more images of a parking area. In addition, the device may include determining, based on the one or more images, a first available parking spot. The device may include determining a second available parking spot adjacent to the first available parking spot, where the second available parking spot is a pull-through parking spot accessible by maneuvering through the first available parking spot. Moreover, the device may include displaying to a user, via a vehicle interface, the one or more images of the parking area, an indication of a location of the pull-through parking spot. Also, the device may include receiving, via the vehicle interface, a selection to park the vehicle in the pull-through parking spot. Further, the device may include parking the vehicle in the pull-through parking, where the parking is performed autonomously.

20 Claims, 6 Drawing Sheets

(51) Int. Cl.
*G06V 10/10* (2022.01)
*G06V 20/58* (2022.01)
*G08G 1/14* (2006.01)

(52) U.S. Cl.
CPC ....... *G08G 1/143* (2013.01); *B60W 2050/146* (2013.01); *B60W 2420/403* (2013.01); *B60W 2420/54* (2013.01); *B60W 2540/215* (2020.02)

(56) References Cited

U.S. PATENT DOCUMENTS

2009/0040068 A1* 2/2009 Oyobe ................. B60L 53/305
340/932.2
2017/0329346 A1* 11/2017 Latotzki ................ G08G 1/202

* cited by examiner

SYSTEMS AND METHODS FOR DETECTING AVAILABLE PARKING SPOTS WITH OPTIONAL PULL-THROUGH PARKING SPOTS

TECHNICAL FIELD

The present disclosure relates to methods and systems for detecting available parking spots with optional pull-through parking spots for display to a user via a user-interface.

BACKGROUND

When a driver of a vehicle navigates into a parking area, the driver may attempt to visually identify parking spot availability. Many parking areas, depending on environment and lighting conditions, may make manual identification of available parking spots difficult. Further, when limited to a visual inspection of parking spot availability, impediments to parking may be difficult to identify. It would be desirable to provide assistance to a driver by identifying available parking spots in a parking area.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, methods may include receiving, via one or more image sensors associated with a vehicle, in response to an activation of a parking assist mode, one or more images of a parking area. Methods may also include determining, based on the one or more images, a first available parking spot. Methods may furthermore include determining, based on the first available parking spot, a second available parking spot adjacent to the first available parking spot, where the second available parking spot is a pull-through parking spot accessible by maneuvering through the first available parking spot. Methods may in addition include displaying to a user, via a vehicle interface, the one or more images of the parking area, an indication of a location of the pull-through parking spot, and an indication that the pull-through parking spot is available to park in. Method may moreover include receiving, from the user, via the vehicle interface, a selection to park the vehicle in the pull-through parking spot. Methods may also include parking the vehicle in the pull-through parking spot by maneuvering the vehicle through the available parking spot, where the parking is performed autonomously in response to the selection received by the user via the vehicle interface.

Other embodiments of this aspect include corresponding computer systems, apparatus, and computer programs recorded on one or more computer storage devices, each configured to perform the actions of the methods.

Implementations may include one or more of the following features. The method may include: redirecting, autonomously, the first vehicle to the first available parking spot in response to a detection of another vehicle maneuvering into the pull-through parking spot. The method may include where the one or more image sensors includes at least one of an ultrasonic sensor and a camera sensor. The method may include determining, based on the one or more images, a third available parking spot; determining, based on the third available parking spot, a fourth available parking spot adjacent the third available parking spot, where the fourth available parking spot is a second pull-through parking spot accessible by maneuvering through the third available parking spot; determining, based on data from the one or more image sensors, that the second pull-through parking spot is a false pull-through parking spot based on detection of an impediment which prevents the vehicle from maneuvering to the second pull-through parking spot by maneuvering through the third available parking spot. The method may include displaying, to the user via the vehicle display, an indication that the second pull-through parking spot is a false pull-through parking spot. The method may include where the impediment is confirmed by the user and may include at least one of a raised divider, a sign post, an uneven-slope, a ditch, a pot-hole, a small vehicle, and a curb. The method may include where the one or more images of the parking area are stitched together to form a top-down view of the parking area. The method may include where the top-down view of the parking area is overlaid with the indication of the location of the first available parking spots and the pull-through parking spot.

Implementations of the described techniques may include hardware, a method or process, or a computer tangible medium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles (e.g., cars, trucks, vans, SUVs, etc.) can be equipped with a camera system that generates a top view on the vehicle display (e.g., infotainment screen, dashboard unit, tablet, mobile device, phone, heads up display, etc.). The camera system may capture many different angles in relation to the vehicle and store images containing information that may be relevant to the user. In some instances, it may be beneficial to the user to access some of the images produced by the camera system when they are not in the vehicle.

The systems and methods described herein may be configured to utilize the camera system to analyze image data of a parking area to determine parking spot availability. While a human user may be limited by their field of view when looking for an available parking spot, a camera system may obtain images from multiple angles simultaneously which may allow a computing system associated with the user to detect available parking spots in real-time. The systems and methods described herein may be configured to provide to a user, via an interface, the available parking spots in the parking area the vehicle is located in. In some embodiments, the locating of available parking spots may be associated with a parking assist mode which may be triggered by a vehicle traveling below a predetermined speed and/or when a vehicle's location overlaps that of a parking area.

The systems and methods described herein may be configured to determine whether a pull-through parking spot is available by navigating through one of the available parking spots. For example, a parking area often positions parking spots adjacent to one another. When both adjacent parking spots are unoccupied, both are available parking spots but with the pull-through parking spot having the advantage that the car will be facing outward in the pull-through spot without additional turning and navigating. A car facing outward has the advantage of pulling out straight for added convenience and less time spent maneuvering backward before navigating forward. The camera system will be more adept at determining a pull-through parking spot than a human user limited by their field of vision.

The systems and methods described herein may utilize ultrasonic sensors as part of the camera system to recognize impediments that will not allow a vehicle to navigate to a pull-through parking spot. For example, an ultrasonic sensor may determine impediments in low light conditions which are common in underground parking areas and/or parking areas inside parking structures. For example, an impediment may exist between two adjacent parking spots such as, but not limited to a sign post, a ditch, a concrete divider, a small vehicle (e.g., motorcycle, golf cart, scooter, and the like), and/or any possible object commonly found in parking areas. In some embodiments, the systems and methods described herein may be utilized to avoid navigating through an impediment, as such an attempt may damage the vehicle. The systems and methods described herein may be configured to alert the user of a false pull-through parking spot via the vehicle interface.

The systems and methods described herein may accept a user input indicating a desire to park the vehicle in an available parking spot, including pull-through parking spot. The vehicle, having autonomous driving features, may present to the user options of how the vehicle should navigate into the available parking spot indicated by the user. For example, the user may indicate the vehicle should back into the available parking spot resulting in the vehicle facing outward. In another example, the user may indicate the vehicle should park front first resulting in the vehicle rear facing out. In another example, the user may indicate the vehicle should park in a pull-through spot, by navigating through an available parking spot resulting in the vehicle facing outward, without the need for additional turning or backing in. It would be desirable for a driver to select a pull-through parking spot in order to obtain an end result of a vehicle facing outward without additional maneuvering and navigating time.

Figure 1:
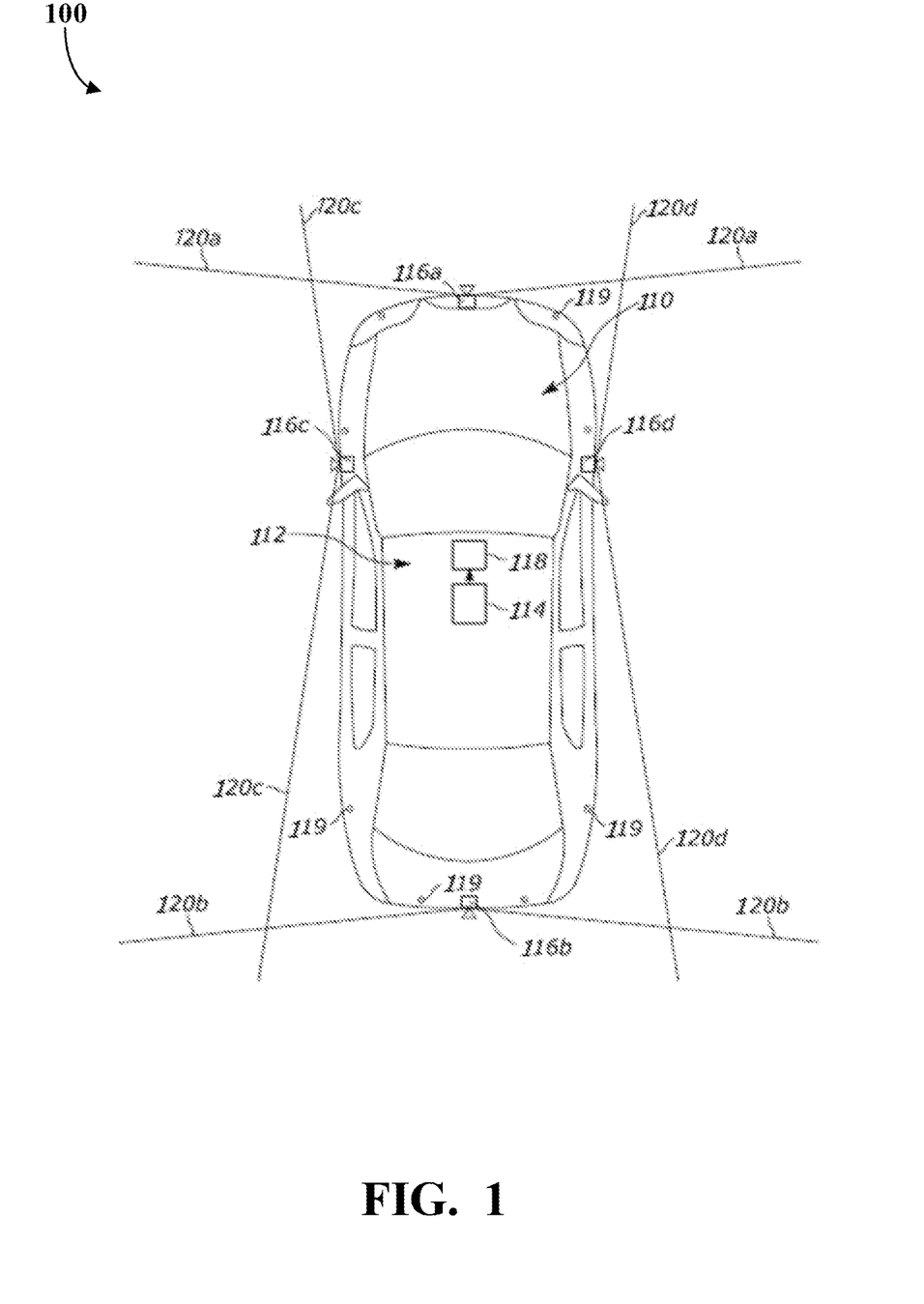
FIG. 1 illustrates a schematic of a vehicle according to an embodiment, shown here from a top view.

FIG. 1 illustrates a schematic 100 of a vehicle 110 according to an embodiment, shown here from a top view. The vehicle 110 is a passenger car, but can be other types of vehicles such as a truck, van, or sports utility vehicle (SUV), or the like. The vehicle 110 includes a camera system 112 which includes an electronic control unit (ECU) 114 connected to a plurality of cameras 116a, 116b, 116c, and 116d. In general, the ECU 114 includes one or more processors programmed to process the images data associated with the cameras 116a-d and generate a composite top view on a vehicle display 118. In addition, as will be described further below, the vehicle 110 includes a plurality of proximity sensors (e.g., ultrasonic sensors, radar, sonar, LiDAR, etc.) 119. The proximity sensors 119 can be connected to their own designated ECU that develops a sensor map of objects external to the vehicle. Alternatively, the proximity sensors can be connected to ECU 114.

The ECUs disclosed herein may more generally be referred to as a controller. In the case of an ECU of a camera system 112, the ECU can be capable of receiving image data from the various cameras (or their respective processors), processing the information, and outputting instructions to combine the image data in generating a composite top view, for example. In the case of an ECU associated with the proximity sensors 119, the ECU can be capable of receiving sensor data from the various proximity sensors (or their respective processors), processing the information, and outputting a sensor map of objects surrounding the vehicle; this ECU can also be capable of causing alerts to be sent to the driver during parking maneuvers that might warn the driver of the proximity of the detected objects. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL. The computer-executable instructions of the programs may be configured to, upon execution by the processor, cause the harmonization techniques and algorithms described herein.

In the schematic 100, the cameras 116-d are located about different quadrants of the vehicle, although more than four cameras may be provided in the camera system 112. Each camera 116a-d may have a fish-eye lens to obtain images with an enlarged field of view, indicated by boundary lines 120a-d. In an example, a first camera 116a faces an area in front of the vehicle, and captures images with a field of view indicated by boundary lines 120a. The first camera 116a can therefore be referred to as the front camera. A second camera 116b faces an area behind the vehicle, and captures images with a field of view indicated by boundary lines 120b. The second camera 116b can therefore be referred to as the rear camera. A third camera 116c faces an area on the left side of the vehicle, and captures images with a field of view indicated by boundary lines 120c. The third camera 116c can therefore be referred to as the left camera, or left-side camera. The third camera 116c can also be mounted on or near the vehicle's left wing mirror, and can therefore be referred to as a mirror left (ML) camera. A fourth camera 116d faces an area on the right side of the vehicle, and captures images with a field of view indicated by boundary lines 120d. The fourth camera 116d can therefore be referred to as the right camera, or right-side camera. The fourth camera 116d can also be mounted on or near the vehicle's right wing mirror, and can therefore be referred to as a mirror right (MR) camera. The images (or the associated image data) originating from the cameras 116a-d can be processed by the ECU 114 (e.g., stitched together, distorted, combined, and harmonized) to generate the composite top view on the vehicle display 118.

Figure 2:
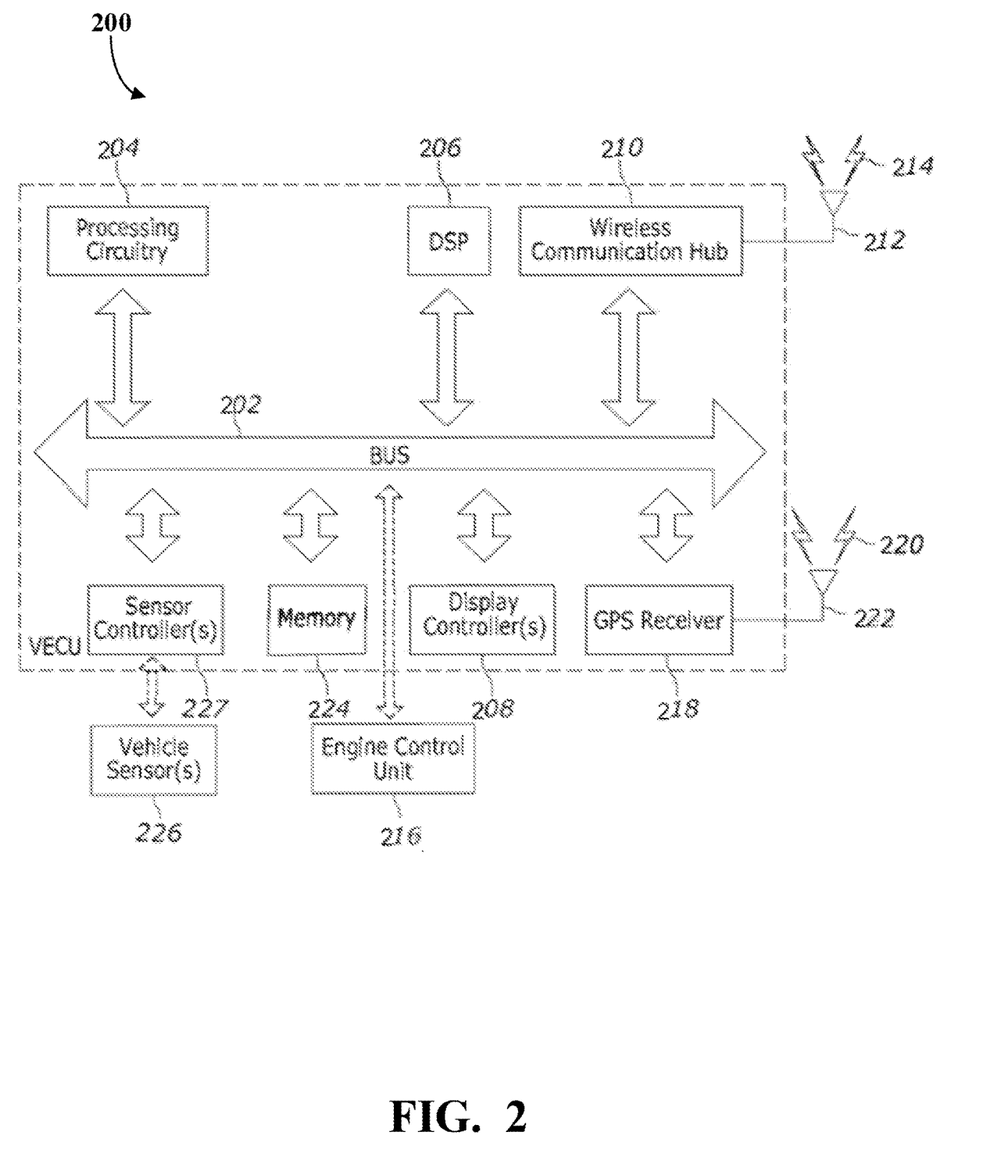
FIG. 2 is a block diagram of internal components of an exemplary embodiment of a computing system.

FIG. 2 is a block diagram of internal components of an exemplary embodiment of a computing system 200. The computing system 200 may include or be used to implement the computing systems described above. In this embodiment, the computing system 200 may be embodied at least in part in a vehicle electronics control unit (VECU). It should be noted that FIG. 2 is meant only to provide a generalized illustration of various components, any or all of which may be utilized as appropriate. It can be noted that, in some instances, components illustrated by FIG. 2 can be localized to a single physical device and/or distributed among various networked devices, which may be disposed at different physical locations.

The computing system 200 has hardware elements that can be electrically coupled via a BUS 202. The hardware elements may include processing circuitry 204 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 206, depending on desired functionality. The computing system 200 can also include one or more display controllers 208, which can control the display devices disclosed above, such as an in-vehicle touch screen, screen of a mobile device, and/or the like.

The computing system 200 may also include a wireless communication hub 210, or connectivity hub, which can include a modem, a network card, an infrared communication device, a wireless communication device, and/or a chipset (such as a Bluetooth device, an IEEE 802.11 device, an IEEE 802.16.4 device, a WiFi device, an LTE device, cellular communication facilities including 4G, 5G, etc.), and/or the like. The wireless communication hub 210 can permit data to be exchanged with a network, wireless access points, other computing systems, etc. The communication can be carried out via one or more wireless communication antenna 212 that send and/or receive wireless signals 214.

The computing system 200 can also include or be configured to communicate with an engine control unit 216, or other type of controller described herein. In the case of a vehicle that does not include an internal combustion engine, the engine control unit may instead be a battery control unit or electric drive control unit configured to command propulsion of the vehicle. In response to instructions received via the wireless communications hub 210, the engine control unit 216 can be operated in order to control the movement of the vehicle during, for example, a parking procedure.

The computing system 200 also includes vehicle sensors 226 such as those described above with reference to FIG. 1. These sensors can include, without limitation, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. These sensors can be controlled via associated sensor controller(s) 227.

The computing system 200 may also include a GPS receiver 218 capable of receiving signals 220 from one or more GPS satellites using a GPS antenna 222. The GPS receiver 218 can extract a position of the device, using conventional techniques, from satellites of a GPS system, such as a global navigation satellite system (GNSS) (e.g., Global Positioning System (GPS)), Galileo, GLONASS, Compass, Galileo, Beidou and/or other regional systems and/or the like.

The computing system 200 can also include or be in communication with a memory 224. The memory 224 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 224 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

Figure 3:
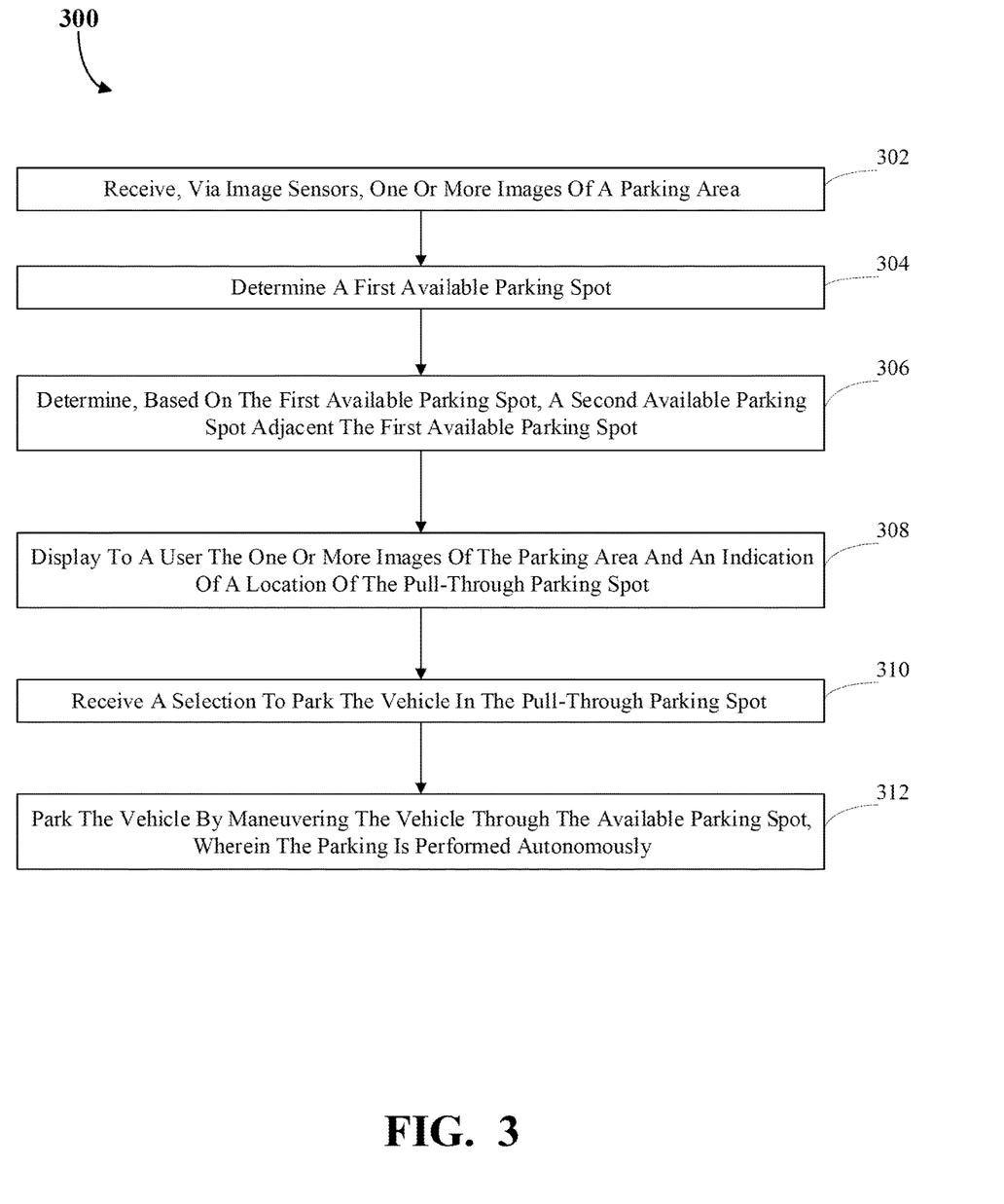
FIG. 3 is a flowchart of an example process for accepting user input commanding a vehicle to autonomously park in a pull-through parking spot, according to an example of the present disclosure.

FIG. 3 is a flow chart of a process 300 for accepting user input commanding a vehicle to autonomously park in a pull-through parking spot, according to an example of the present disclosure. According to an example, one or more process blocks of FIG. 3 may be performed by processor circuitry 204 of computing system 200.

As shown in FIG. 3, process 300 may include receiving, via one or more image sensors associated with a vehicle, in response to an activation of a parking assist mode, one or more images of a parking area (block 302). For example, the camera system 112 may obtain one or more images of the parking area from multiple angles while the vehicle navigates through the parking area. In some embodiments, the one or more images captured from the camera system 112 may be displayed to the user via the vehicle display 118. In some embodiments, the one or more images may be stitched together to form a top-down view of the parking area surrounding the vehicle. In some embodiments, the receiving of images from the one or more image sensors may be triggered by the vehicle entering parking assist mode. In some embodiments, parking assist mode may be triggered in response to, the vehicle driving below a predetermined threshold (e.g., 5 miles per hour), upon manual activation by the user, upon entering a geo-fenced area known to be a parking area, or any appropriate indicator that the user is attempting to park.

As in addition shown in FIG. 3, process 300 may include determining, based on the one or more images, a first available parking spot (block 304). For example, the process 300 may analyze indicators of a parking spot in the parking area including, but not limited to: parking spot lines, parking signs, interface with wireless communication beacons associated with the parking area (e.g., Bluetooth location tracking (BLE), near field communication (NFC), real time location system (RTLS), cellular triangulation, radio frequency identification (RFID), global positioning system, and/or any appropriate method of determining a location of a parking spot). When the position of parking spots is determined the camera system 112 may use the ultrasonic sensor(s) and/or LIDAR(s) to determine whether or not the parking spots are occupied. Parking spots without vehicles or other impediments occupying the boundaries of the parking spot may be determined as being available parking spots.

As also shown in FIG. 3, process 300 may include determining, based on the first available parking spot, a second available parking spot adjacent to the first available parking spot, where the second available parking spot is a pull-through parking spot accessible by maneuvering through the first available parking spot (block 306). For example, the one or more images obtained from the camera system 112 may be used to determine available parking spots which are adjacent to available parking spots closest to the vehicle. For example, an available parking spot may be near the vehicle and parking spot adjacent to the available parking spot may also be available by navigating through the available parking spot. Such a parking spot may be considered a pull-through parking spot. In some embodiments, the process 300 may consider the angle of the parking lines when considering whether or not a parking spot adjacent to an available parking spot is a pull-through parking spot. For example, a parking area having lanes of traffic that only allow vehicle navigation in one direction may not be a good candidate for pull-through parking because the vehicle would be forward facing in a lane that cannot allow a vehicle to navigate out of the spot in a manner that is consistent with the one way lane it will occupy. Such a spot would not be considered a good candidate for pull-through parking.

Figure 6A:
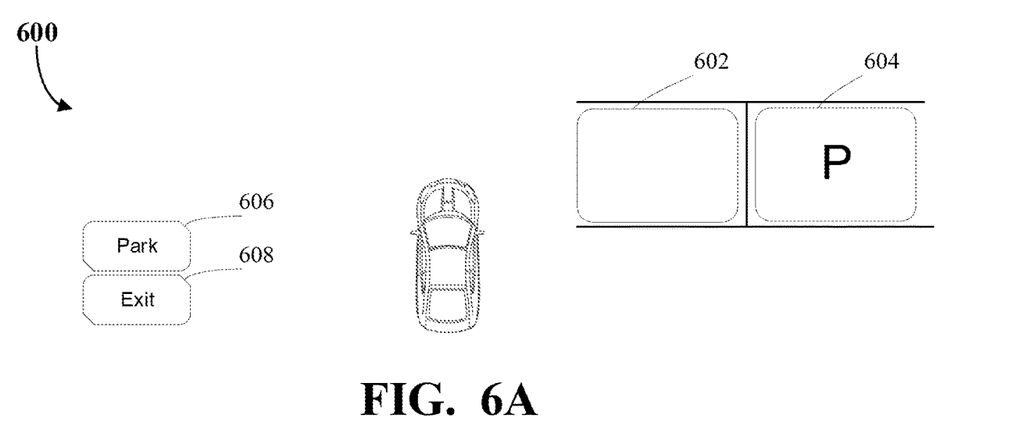
FIGS. 6A, 6B, and 6C illustrate example user interfaces, according to an example of the present disclosure.

As further shown in FIG. 3, process 300 may include displaying to a user, via a vehicle interface, the one or more images of the parking area, an indication of a location of the pull-through parking spot, and an indication that the pull-through parking spot is available to park in (block 308). For example, process 300 may display to a user, via the vehicle display 118, an interface similar to that discussed in FIG. 6 below. In some embodiments, the display to the user may include an overlay of the interface onto the one or more images obtained from the camera system 112. In some embodiments, the interface may include buttons associated with each available parking spot and pull-through parking spot, selection of which indicates the user's desire to park in the selected parking spot.

As in addition shown in FIG. 3, process 300 may include receiving, from the user, via the vehicle interface, a selection to park the vehicle in the pull-through parking spot (block 310). In some embodiments, the user may select a button on the user interface associated with the pull-through parking spot. In some embodiments, the user input may be received via an interaction with an interface including, but not limited to, a touchscreen interface, a tactile button interface, a speech chat interface, a mouse interface, a keyboard interface, menu based interface, natural language interface, command line interface, and/or any appropriate form of accepting a command form a user.

As also shown in FIG. 3, process 300 may include parking the vehicle in the pull-through parking spot by maneuvering the vehicle through the available parking spot, where the parking is performed autonomously in response to the selection received by the user via the vehicle interface (block 312). For example, process 300 may determine a vehicle maneuver in order to navigate the vehicle into the pull-through parking spot selected by the user based on spatial data obtained from the camera system 112. In some embodiments, autonomous driving capabilities of the vehicle execute the navigation commands generated by the process 300. In some embodiments, the navigation instructions include navigating through the available parking spot in order to occupy the pull-through parking spot.

It should be noted that while FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
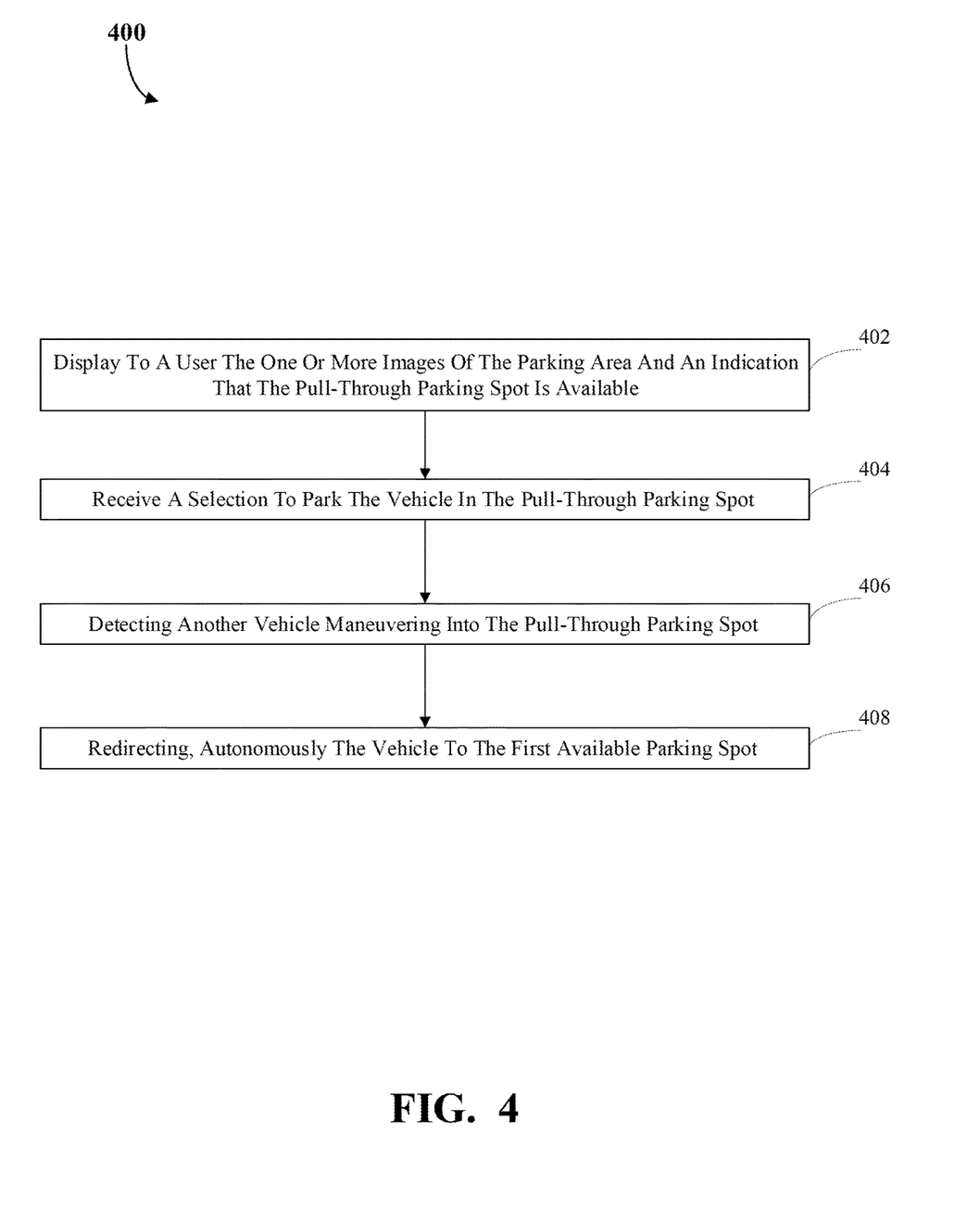
FIG. 4 is a flow chart of a process for redirecting a vehicle attempting to park in a pull-through parking spot which has since become unavailable, according to an example of the present disclosure.

FIG. 4 is a flow chart of a process 400 for redirecting a vehicle attempting to park in a pull-through parking spot which has since become unavailable, according to an example of the present disclosure. According to an example, one or more process blocks of FIG. 4 may be performed by processor circuitry 204 of computing system 200.

As shown in FIG. 4, process 400 may include displaying to a user, via a vehicle interface, the one or more images of the parking area, an indication of a location of the pull-through parking spot, and an indication that the pull-through parking spot is available to park in (block 402). For example, process 400 may display to a user, via the vehicle display 118, an interface similar to that discussed in FIG. 6 below. In some embodiments, the display to the user may include an overlay of the interface onto the one or more images obtained from the camera system 112. In some embodiments, the interface may include buttons associated with each available parking spot and pull-through parking spot, selection of which indicates the user's desire to park in the selected parking spot.

As in addition shown in FIG. 4, process 400 may include receiving, from the user, via the vehicle interface, a selection to park the vehicle in the pull-through parking spot (block 404). In some embodiments, the user may select a button on the user interface associated with the pull-through parking spot. In some embodiments, the user input may be received via an interaction with an interface including, but not limited to, a touchscreen interface, a tactile button interface, a speech chat interface, a mouse interface, a keyboard interface, menu based interface, natural language interface, command line interface, and/or any appropriate form of accepting a command form a user. In some embodiments, the interface may display an indicator overlaid onto one or more images of the park area presented as a top-down view of the vehicle's current position. For example, the user may tap a touch screen device on the indicator associated with the pull-through parking spot. In some embodiments, the process 400 may further require a confirmation from the user to park the vehicle in the selected parking spot. In some embodiments, a user interface element which is associated with a park command may have an indicator associated with it when a pull-through parking spot is selected. Selection of the user interface element which is associated with a park command may initiate a parking maneuver.

As in addition shown in FIG. 4, process 400 may include detecting, while the vehicle is maneuvering through the first available parking spot to the pull-through parking spot, another vehicle maneuvering into the pull-through parking spot (block 406). For example, while the vehicle is performing a parking maneuver, a vehicle may be detected pulling into the pull-through parking spot from a parallel lane. In some embodiments, the process 400 may determine a vehicle is pulling into the, or intending to pull into, the pull-through parking spot via data received from the camera system 112. In some embodiments, the process 400 may determine another vehicle's navigation path based on the trajectory of the other vehicle. When the other vehicle's trajectory indicates a navigation path which may end in the pull-through parking spot, the process 400 may determine that the other is attempting to park in the pull-through parking spot.

As in addition shown in FIG. 4, process 400 may include redirecting, autonomously, in response to the detection of another vehicle, the vehicle to the first available parking spot (block 408). In some embodiments, the vehicle may be engaged in navigation to occupy the pull-through parking spot. While navigating, the process 400 may determine that a vehicle is parked in, or attempting to park in the pull-through parking spot from a parallel lane in the parking area. In some embodiments, the process 400 may redirect the vehicle navigation to occupy the available parking spot. In some embodiments, the vehicle may come to a stop instead of continuing forward into the pull-through parking spot. In some embodiments, the vehicle may have already partially maneuvered into the pull-through parking spot when the other vehicle is detected. When already partially maneuvered into the pull-through parking spot, the process 400 may reverse course back into the available parking spot.

It should be noted that while FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
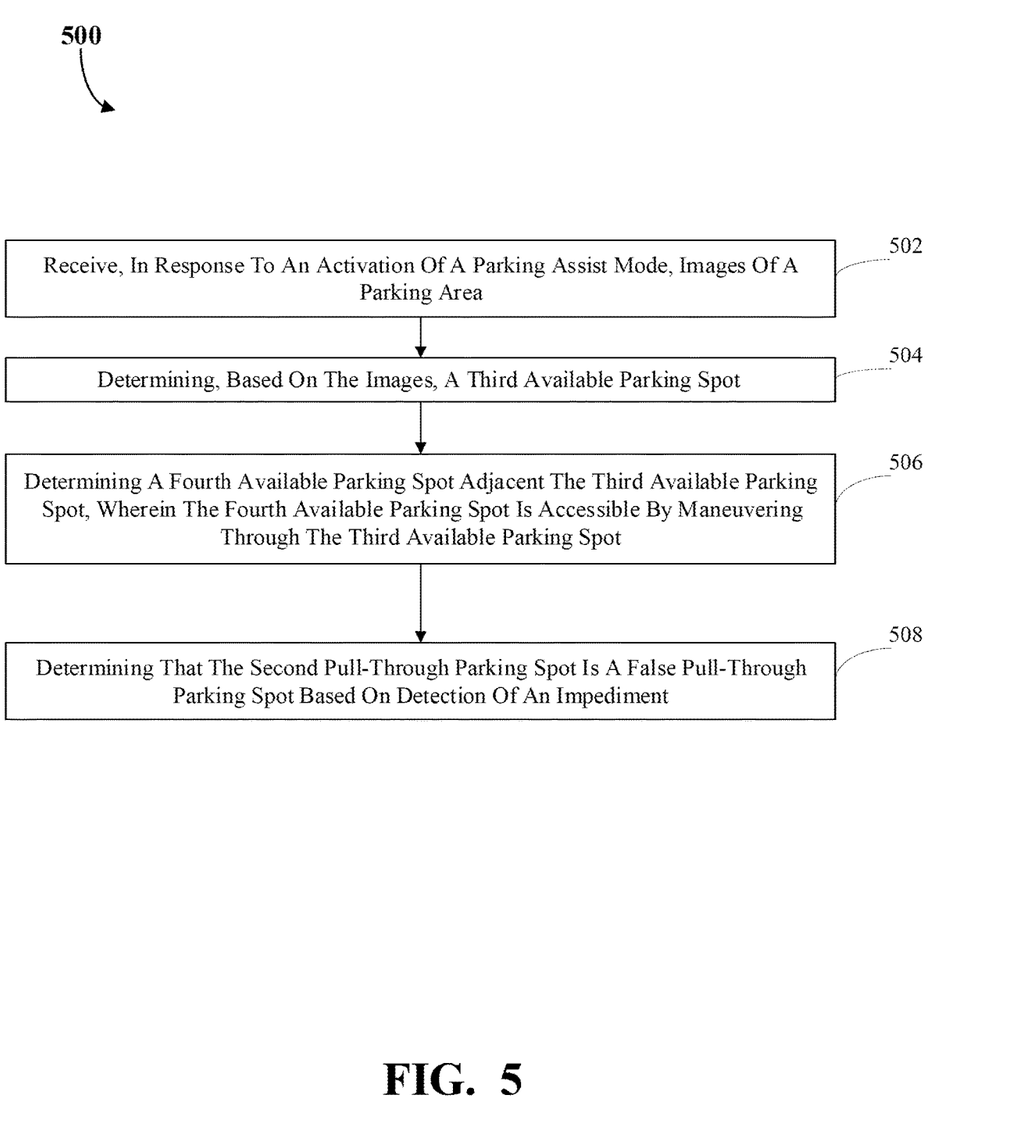
FIG. 5 is a flow chart of a process for determining that a pull-through parking spot is a false pull-through parking spot, according to an example of the present disclosure.

FIG. 5 is a flow chart of a process 500 for determining that a pull-through parking spot is a false pull-through parking spot, according to an example of the present disclosure. According to an example, one or more process blocks of FIG. 5 may be performed by processor circuitry 204 of computing system 200.

As shown in FIG. 5, process 500 may include receiving, via one or more image sensors associated with a vehicle, in response to an activation of a parking assist mode, one or more images of a parking area (block 502). For example, the camera system 112 may obtain one or more images of the parking area from multiple angles while the vehicle navigates through the parking area. In some embodiments, the one or more images captured from the camera system 112 may be displayed to the user via the vehicle display 118. In some embodiments, the one or more images may be stitched together to form a top-down view of the parking area surrounding the vehicle. In some embodiments, the receiving of images from the one or more image sensors may be triggered by the vehicle entering parking assist mode. In some embodiments, parking assist mode may be triggered in response to, the vehicle driving below a predetermined threshold (e.g., 5 miles per hour), upon manual activation by the user, upon entering a geo-fenced area known to be a parking area, or any appropriate indicator that the user is attempting to park.

As in addition shown in FIG. 5, process 500 may include determining, based on the one or more images, a third available parking spot (block 504). For example, the process 500 may analyze indicators of a parking spot in the parking area including, but not limited to: parking spot lines, parking signs, interface with wireless communication beacons associated with the parking area (e.g., Bluetooth location tracking (BLE), near field communication (NFC), real time location system (RTLS), cellular triangulation, radio frequency identification (RFID), global positioning system, and/or any appropriate method of determining a location of a parking spot). When the position of parking spots is determined the camera system 112 may use the ultrasonic sensor(s) and/or LIDAR(s) to determine whether or not the parking spots are occupied. Parking spots without vehicles or other impediments occupying the boundaries of the parking spot may be determined as being available parking spots.

As in addition shown in FIG. 5, process 500 may include determining, based on the third available parking spot, a fourth available parking spot adjacent the third available parking spot, wherein the fourth available parking spot is a second pull-through parking spot accessible by maneuvering through the third available parking spot (block 506).

As in addition shown in FIG. 5, process 500 may include determining, based on data from the ultrasonic sensor, that the second pull-through parking spot is a false pull-through parking spot based on detection of an impediment which prevents the vehicle from parking in the second pull-through parking spot by maneuvering through the third available parking spot (block 508). For example, an impediment may be detected such as, but not limited to, a raised divider, a sign post, an uneven-slope, a pot-hole, a small vehicle (e.g., motorcycle, golf cart, scooter, and the like), and a curb. In some embodiments, the user may be attempting to navigate into a pull-through parking spot in a manual driving mode, or manually while in a parking assist mode. While navigating through the third available parking spot, the process 500 may determine that the fourth available parking spot is the ultimate intent of the user. The process 500 may warn the user to halt their progress to the fourth available parking spot because it is a false pull-through parking spot. In some embodiments, the process 400 may display, via the vehicle display 118, that the fourth available parking spot is a false pull-through parking spot. The process 500 may add to the interface displayed to the user an indication that the fourth available parking spot is a false pull-through parking spot. For example, an indication on the user interface may include, but is not limited to, text overlaid onto the rectangle, a color filling the rectangle, the color of the rectangle itself, a highlight, a symbol which indicates a vacancy, the lines of the rectangle being dashed or animated, and/or any appropriate means of differentiating the false pull-through parking spot from the available parking spots.

It should be noted that while FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6A illustrates example interface 600 for presenting an available parking spot to the user, in accordance with the present disclosure. The interface 600 may be created by processing circuitry 204 and displayed to the user via vehicle display 118.

Interface 600 may include user interface element 602 which indicates a parking spot which is not available. In some embodiments, the user interface element 602 may include a rectangle sized according to the dimensions of the parking spot. In some embodiments, the special dimensions of the parking spot may be determined based on lines drawn on the surface of the parking area. In some embodiments, the surface of the parking area may be detected by the camera system 112.

Interface 600 may include user interface element 604 which indicates an available parking spot. In some embodiments, the user interface element 604 may include a rectangle sized according to the dimensions of the available parking spot. In some embodiments, the user interface element 604 includes an indicator that the parking spot is an available parking spot and differentiates the user interface element 604 from the user interface element 602. For example, a visual differentiation may include, but is not limited to, text overlaid onto the rectangle, a color filling the rectangle, the color of the rectangle itself, a highlight, a symbol which indicates a vacancy, the lines of the rectangle being dashed or animated, and/or any appropriate means of differentiating the user interface element 604 from the user interface element 602. In some embodiments, the special dimensions of the available parking spot may be determined based on lines drawn on the surface of the parking area. In some embodiments, the surface of the parking area may be detected by the camera system 112.

Interface 600 may include user interface element 606 which accepts input from a user indicating a command that the vehicle park in the selected available parking spot. For example, when a vehicle is not parked in a parking spot and the user has selected an available parking spot, the user interface element may become highlighted (as shown). Upon selection of the user interface element 606 by the user, a command to navigate into the parking spot is executed by the vehicle. In some embodiments, user interface element 606 is a button having text overlaid which indicates selection of the button will initiate a command to navigate the vehicle into the parking spot.

Interface 600 may further include user interface element 608 which accepts input from a user indicating a command that the vehicle exit the parking assist mode. In some embodiments, the selection of the user interface element 608 may close interface 600. For example, the one or more images obtained from the camera system 112 may be used to determine available parking spots which are adjacent to available parking spots closest to the vehicle. For example, an available parking spot may be near the vehicle and parking spot adjacent to the available parking spot may also be available by navigating through the available parking spot. Such a parking spot may be considered a pull-through parking spot. In some embodiments, the interface 600 may consider the angle of the parking lines when considering whether or not a parking spot adjacent to an available parking spot is a pull-through parking spot. For example, a parking area having lanes of traffic that only allow vehicle navigation in one direction may not be a good candidate for pull-through parking because the vehicle would be forward facing in a lane that cannot allow a vehicle to navigate out of the spot in a manner that is consistent with the one way lane it will occupy. Such a spot would not be considered a good candidate for pull-through parking.

In some embodiment, the interface 600 may be overlaid onto an image data provided by the camera system 112. In some embodiment, user interface element 602 may be overlaid onto the location of an unavailable parking spot in the image obtained by the camera system 112. In some embodiments, the user interface element 604 may be overlaid onto the location of an available parking spot in the image obtained from the camera system 112.

Figure 6B:
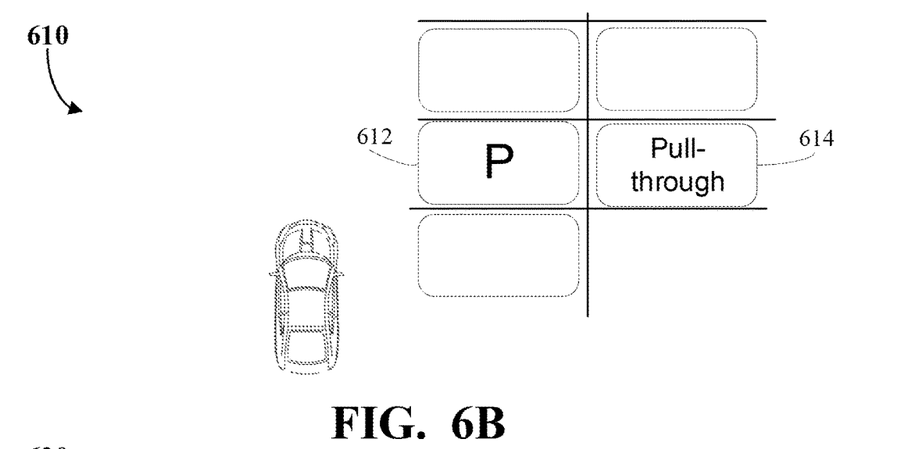

FIG. 6B illustrates an example embodiment of user interface 610 which displays to a user multiple instances of available parking spots and an available pull-through parking spot. The interface 610 may be created by processing circuitry 204 and displayed to the user via vehicle display 118.

Interface 610 may include user interface element 612 which may indicate an available parking spot. In some embodiments, the user interface element 612 may include a rectangle sized according to the dimensions of the available parking spot. In some embodiments, the user interface element 612 includes an indicator that the parking spot is an available parking spot and differentiates the user interface element 612 from the user interface element 612. For example, a visual differentiation may include, but is not limited to, text overlaid onto the rectangle, a color filling the rectangle, the color of the rectangle itself, a highlight, a symbol which indicates a vacancy, the lines of the rectangle being dashed or animated, and/or any appropriate means of differentiating the user interface element 612 from the user interface element indicating an occupied parking spot. In some embodiments, the special dimensions of the available parking spot may be determined based on lines drawn on the surface of the parking area. In some embodiments, the surface of the parking area may be detected by the camera system 112.

Interface 610 may include user interface element 614 which may indicate a pull-through parking spot in relation to the parking spot represented by user interface element 612. In some embodiments, user interface element 614 may include a rectangle spatially configured in reference to the parking spot boundaries that user interface element 614 represents. The spatial boundaries of the parking spot may be determined based on lines drawn on the parking area surface and recognized based on one or more images obtained from the camera system 112. In some embodiments, the user interface element may include indicators which communicate to the user that the parking spot associated with user interface element 614 is a pull-through parking spot. For example, the user interface element 614 indicator may include, but is not limited to, text overlaid onto the rectangle, a color filling the rectangle, the color of the rectangle itself, a highlight, a symbol which indicates a vacancy, the lines of the rectangle being dashed or animated, and/or any appropriate means of indicating that the user interface element 614 represent a pull-through parking spot.

In some embodiment, the interface 610 may be overlaid onto an image data provided by the camera system 112. In some embodiment, user interface element 612 may be overlaid onto the location of an unavailable parking spot in the image obtained by the camera system 112. In some embodiments, the user interface element 614 may be overlaid onto the location of an available parking spot in the image obtained from the camera system 112.

Figure 6C:
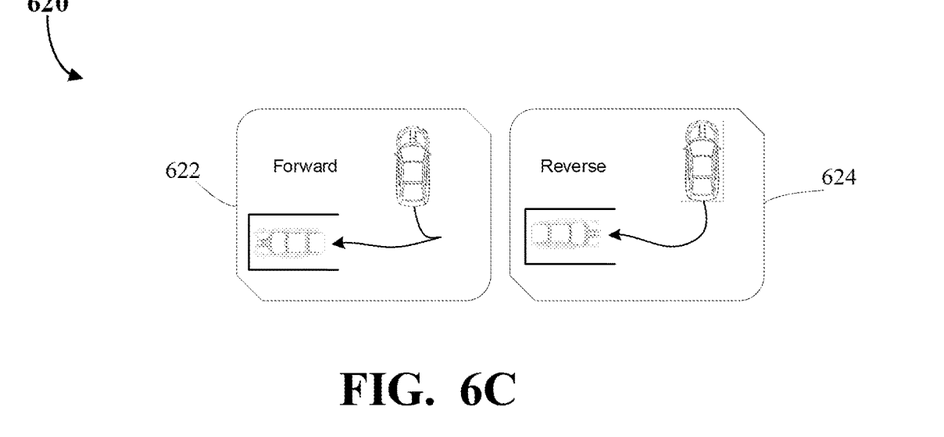

FIG. 6C illustrates an example embodiment of user interface 620 which displays to a user two options as to how the vehicle may navigate into a selected available parking spot after a user has selected an available parking spot. The interface 620 may be created by processing circuitry 204 and displayed to the user via vehicle display 118.

The interface 620 may include user interface element 622 which may be selected by a user to initiate a command to maneuver the vehicle into the selected available parking spot by parking the vehicle front first, resulting in the rear of the vehicle facing outward. In some embodiments, the user interface element 622 may include an indication of how the vehicle may maneuver into the selected parking spot. For example, an indication of how the vehicle may maneuver may include, but is not limited to, text describing the parking maneuver, a diagram illustrating the parking maneuver, an overlay of the current position of the vehicle in reference with the selected parking spot, and/or any appropriate means of indicating to the user a forward parking maneuver.

The interface 620 may include user interface element 622 which may be selected by a user to initiate a command to maneuver the vehicle into the selected available parking spot by parking the vehicle front first, resulting in the rear of the vehicle facing outward. In some embodiments, the user interface element 622 may include an indication of how the vehicle may maneuver into the selected parking spot. For example, an indication of how the vehicle may maneuver may include, but is not limited to, text describing the parking maneuver, a diagram illustrating the parking maneuver, an overlay of the current position of the vehicle in reference with the selected parking spot, and/or any appropriate means of indicating to the user a forward parking maneuver.

The interface 620 may include user interface element 624 which may be selected by a user to initiate a command to maneuver the vehicle into the selected available parking spot by parking the vehicle back first, resulting in the front of the vehicle facing outward. In some embodiments, the user interface element 624 may include an indication of how the vehicle may maneuver into the selected parking spot. For example, an indication of how the vehicle may maneuver may include, but is not limited to, text describing the parking maneuver, a diagram illustrating the parking maneuver, an overlay of the current position of the vehicle in reference with the selected parking spot, and/or any appropriate means of indicating to the user a reverse parking maneuver.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the systems and methods described herein that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for autonomous pull-through parking, the method comprising:
   receiving, via one or more image sensors associated with a vehicle, in response to an activation of a parking assist mode, one or more images of a parking area;
   determining, based on the one or more images, a first available parking spot;
   determining, based on the first available parking spot, a second available parking spot adjacent the first available parking spot, wherein the second available parking spot is a pull-through parking spot accessible by maneuvering through the first available parking spot;
   displaying to a user, via a vehicle interface, the one or more images of the parking area, an indication of a location of the pull-through parking spot, and an indication that the pull-through parking spot is available to park in;
   receiving, from the user, via the vehicle interface, a selection to park the vehicle in the pull-through parking spot; and
   parking the vehicle in the pull-through parking spot by maneuvering the vehicle through the first available parking spot, wherein the parking is performed autonomously in response to the selection received by the user via the vehicle interface.

2. The method of claim 1, the method further comprising:
   redirecting, autonomously, the first vehicle to the first available parking spot in response to a detection of another vehicle maneuvering into the pull-through parking spot.

3. The method of claim 1, wherein the one or more image sensors includes at least one of an ultrasonic sensor and a camera sensor.

4. The method of claim 3, the method further comprising:
   determining, based on the one or more images, a third available parking spot;
   determining, based on the third available parking spot, a fourth available parking spot adjacent the third available parking spot, wherein the fourth available parking spot is a second pull-through parking spot accessible by maneuvering through the third available parking spot; and
   determining, based on data from the one or more image sensors, that the second pull-through parking spot is a false pull-through parking spot based on a detection of an impediment which prevents the vehicle from maneuvering to the second pull-through parking spot by maneuvering through the third available parking spot.

5. The method of claim 4, the method further comprising:
   displaying, to the user via the vehicle interface, an indication that the second pull-through parking spot is a false pull-through parking spot.

6. The method of claim 4, wherein the impediment is confirmed by the user and may include at least one of a raised divider, a sign post, an uneven-slope, a ditch, a pot-hole, a small vehicle, and a curb.

7. The method of claim 1, wherein the one or more images of the parking area are stitched together to form a top-down view of the parking area.

8. The method of claim 7, wherein the top-down view of the parking area is overlaid with information related to the location of the first available parking spot and the pull-through parking spot.

9. A device for autonomous pull-through parking comprising:
   one or more processors configured to:
   receive, via one or more image sensors associated with a vehicle, in response to an activation of a parking assist mode, one or more images of a parking area;
   determine, based on the one or more images, a first available parking spot;
   determine, based on the first available parking spot, a second available parking spot adjacent the first available parking spot, wherein the second available parking spot is a pull-through parking spot accessible by maneuvering through the first available parking spot;
   display to a user, via a vehicle interface, the one or more images of the parking area, an indication of a location of the pull-through parking spot, and an indication that the pull-through parking spot is available to park in;
   receive, from the user, via the vehicle interface, a selection to park the vehicle in the pull-through parking spot; and
   park the vehicle in the pull-through parking spot by maneuvering the vehicle through the first available parking spot, wherein the parking is performed autonomously in response to the selection received by the user via the vehicle interface.

10. The device of claim 9, wherein the one or more processors are further configured to:
    redirect, autonomously, the first vehicle to the first available parking spot in response to a detection of another vehicle maneuvering into the pull-through parking spot.

11. The device of claim 9, wherein the one or more image sensors includes at least one of an ultrasonic sensor and a camera sensor.

12. The device of claim 11, wherein the one or more processors are further configured to:
    determine, based on the one or more images, a third available parking spot;
    determine, based on the third available parking spot, a fourth available parking spot adjacent the third available parking spot, wherein the fourth available parking spot is a second pull-through parking spot accessible by maneuvering through the third available parking spot;
    determine, based on data from the one or more image sensors, that the second pull-through parking spot is a false pull-through parking spot based on a detection of an impediment which prevents the vehicle from maneuvering to the second pull-through parking spot by maneuvering through the third available parking spot; and display, to the user via the vehicle interface, an indication that the second pull-through parking spot is a false pull-through parking spot.

13. The device of claim 12, wherein the impediment is confirmed by the user and may include at least one of a raised divider, a sign post, an uneven-slope, a ditch, a pot-hole, a small vehicle, and a curb.

14. The device of claim 9, wherein the one or more images of the parking area are stitched together to form a top-down view of the parking area, and wherein the top-down view of the parking area is overlaid with information related to the first available parking spot and the pull-through parking spot.

15. A device for autonomous pull-through parking comprising:
one or more processors configured to:
receive, via one or more image sensors associated with a vehicle, in response to an activation of a parking assist mode, one or more images of a parking area;
determine, based on the one or more images, a first available parking spot;
determine, based on the first available parking spot, a second available parking spot adjacent the first available parking spot, wherein the second available parking spot is a pull-through parking spot accessible by maneuvering through the first available parking spot;
display to a user, via a vehicle interface, the one or more images of the parking area, an indication of a location of the pull-through parking spot, and an indication that the pull-through parking spot is available to park in;
receive, from the user, via the vehicle interface, a selection to park the vehicle in the pull-through parking spot; and
park the vehicle in the pull-through parking spot by maneuvering the vehicle through the first available parking spot, wherein the parking is performed autonomously in response to the selection received by the user via the vehicle interface.

16. The device of claim 15, wherein the one or more image sensors includes at least one of an ultrasonic sensor and a camera sensor.

17. The device of claim 16, wherein the one or more processors are further configured to:
determine, based on the one or more images, a third available parking spot;
determine, based on the third available parking spot, a fourth available parking spot adjacent the third available parking spot, wherein the fourth available parking spot is a second pull-through parking spot accessible by maneuvering through the third available parking spot; and
determine, based on data from the one or more image sensors, that the second pull-through parking spot is a false pull-through parking spot based on a detection of an impediment which prevents the vehicle from maneuvering to the second pull-through parking spot by maneuvering through the third available parking spot.

18. The device of claim 17, wherein the one or more processors are further configured to:
display, to the user via the vehicle interface, an indication that the second pull-through parking spot is a false pull-through parking spot.

19. The device of claim 17, wherein the impediment may include at least one of a raised divider, a sign post, an uneven-slope, a pot-hole, a small vehicle, and a curb.

20. The device of claim 15, wherein the one or more images of the parking area are stitched together to form a top-down view of the parking area, and wherein the top-down view of the parking area is overlaid with information related to the location of the first available parking spot and the pull-through parking spot.

* * * * *